April 27, 1943.  H. C. ANDRÉ  2,317,711
ACCUMULATOR
Filed Jan. 22, 1937  5 Sheets-Sheet 1
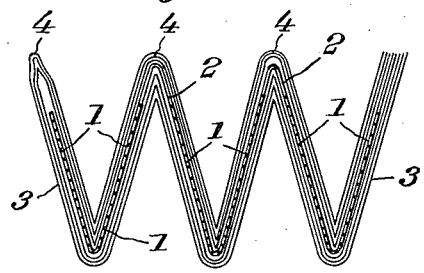
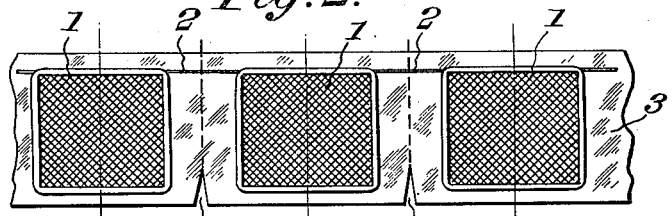
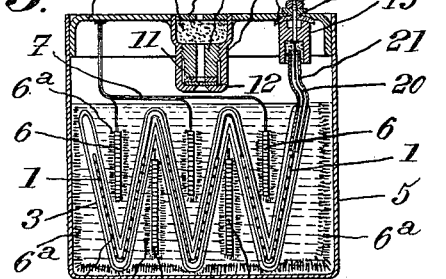
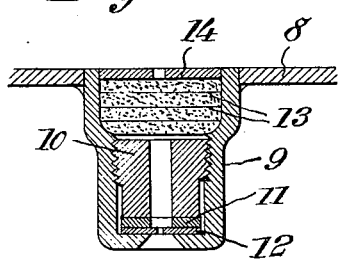
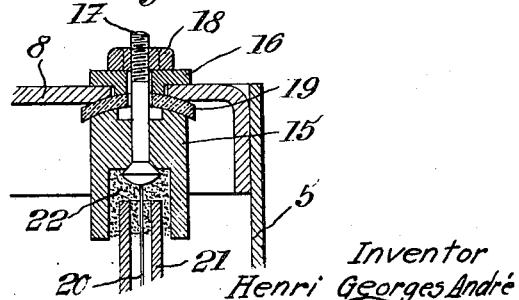
Inventor
Henri Georges André
Attorneys April 27, 1943.  H. C. ANDRÉ  2,317,711
ACCUMULATOR
Filed Jan. 22, 1937  5 Sheets-Sheet 2

Inventor
Henri Georges André
Bailey & Carson
Attorneys

April 27, 1943.　　　　H. C. ANDRÉ　　　　2,317,711
ACCUMULATOR
Filed Jan. 22, 1937　　　5 Sheets-Sheet 4

Inventor
Henri Georges André
Bailey & Larson
Attorneys

April 27, 1943.  H. C. ANDRÉ  2,317,711
ACCUMULATOR
Filed Jan. 22, 1937    5 Sheets-Sheet 5
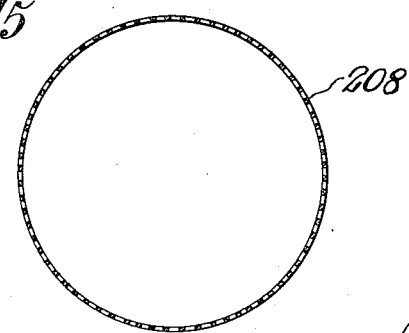
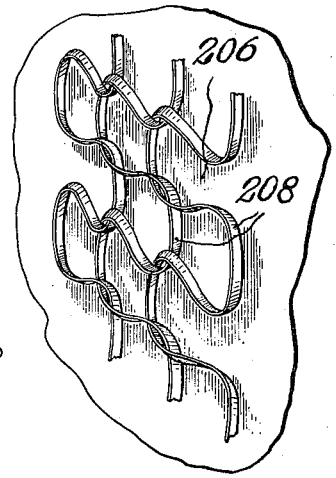
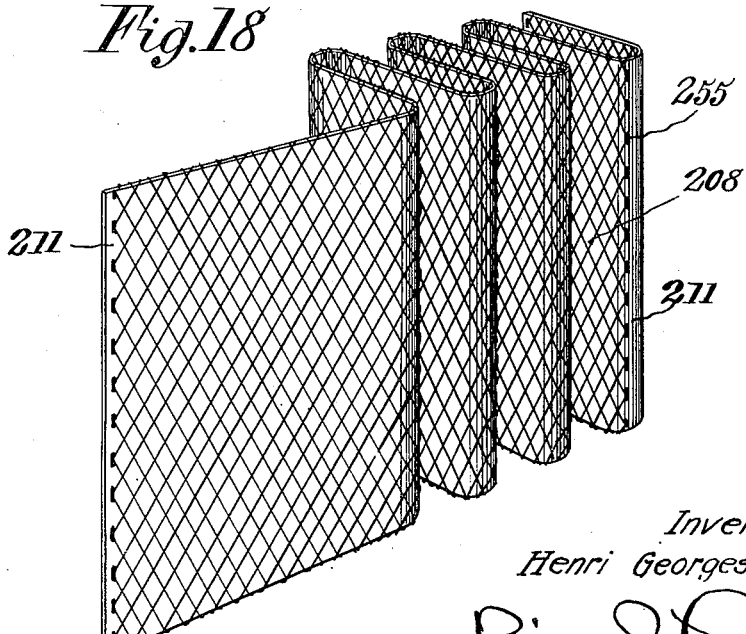
Inventor
Henri Georges André
Bailey & Carson
Attorneys Patented Apr. 27, 1943

2,317,711

UNITED STATES PATENT OFFICE 2,317,711

ACCUMULATOR

Henri Georges André, Colombes, France; vested in the Alien Property Custodian

Application January 22, 1937, Serial No. 121,898
In France February 4, 1936

4 Claims. (Cl. 136—31)

The present invention relates to accumulators having a soluble negative electrode, and more especially those in which the positive electrode is surrounded by a cellulosic diaphragm, and more specifically Cellophane.

The accumulator according to the present invention is preferably of the general type disclosed in the patent to Drumm No. 1,955,115 in which upon discharge the zinc of the negative electrode is dissolved in the electrolyte, while upon charge the zinc is redeposited on the negative electrode.

In accumulators of this type including a Cellophane filling adapted to immobilize the alkaline liquid and to avoid the swelling (which was considered as objectionable) of the soluble metal, it was endeavoured, up to now, to deposit this soluble metal, for instance zinc, in the form of homogeneous layers on supports suitably arranged and made for this purpose, in such manner as to form, during the charging, a compact plate which was again dissolved during the discharge.

Furthermore, it was found that too compact a filling of Cellophane compressed the active matter in an exaggerated manner, which therefore interfered with the diffusion of the charges through the active matter.

The principles above set forth did not give very satisfactory results.

According to the principle of the present invention, the soluble metal is allowed to swell, in opposition to the usual practice and the diffusion of the charges through the active matter is facilitated by giving the latter a structure which is as diffuse as possible.

According to a first embodiment of the present invention, the positive electrode consists of a series of plates of an insoluble material, electrically connected together and kept at a distance from one another, around which a sheet of Cellophane is wound several times. The band thus formed is then folded in zig-zag fashion, and the negative plates are inserted in the folds of the band thus formed, said negative plates being electrically connected to a metallic container or casing and being coated, preferably through electrolysis, with matter soluble in an alkaline solution, with the addition of lithia in saturation proportion. The accumulator thus made has a greatly reduced internal resistance and can give back its charge quickly under uniform tension, even when the discharge is nearing its end.

According to another embodiment of the present invention, which is especially applicable to the case of large size accumulators, having elements of large active area, the positive electrodes surrounded with Cellophane are provided with a wire gauze or other metallic fabric which serves both to maintain Cellophane applied against the surface of the positive electrodes and to form a support upon which the soluble metal deposits during the charge, said metal being zinc for instance. The metal of which this gauze is made must have the property of being insoluble and becoming polarized negatively in the alkaline electrolyte, consisting for instance of copper or silver.

The structure of this wire gauze must be such that it permits a total diffusion of the electrolyte, as it will be more fully explained hereinafter.

Each positive electrode includes a metallic support, constituted by a gauze or perforated sheet, the metal of which is unattacked by the electrolyte and becomes polarized at at least one volt, such a metal being incapable of forming cells with the electrodes with which it is in contact, such as silver or copper. This apertured support is then coated with a silver paste of finely divided structure and finally wrapped with Cellophane of suitable thickness.

Fluidtightness and the mechanical resistance of the electrodes thus made are ensured by means of a layer of an insulating substance melting at a low temperature, which fills and insulates the whole of the lower parts of the electrodes.

The positive connections are made inside this substance unattacked by the electrolyte and which consists preferably of paraffin having a high melting point (from 70 to 72° C.).

A sheet of zinc fitted with adjoining wire gauzes forms the negative electrode.

According to still another embodiment of the invention, the negative electrode consists of a zig-zag shaped plate of a suitable metal, for instance zinc, fitted with an open mesh metallic fabric of a structure similar to those obtained by weaving, said plate being directly in contact, through its ends, with the metallic container or casing of the accumulator.

These and other features of the present invention will clearly result from the following detailed description of some specific embodiments thereof.

Preferred embodiments of the present invention will be hereinafter described, with reference to the accompanying drawings, given merely by way of example, and in which:

Fig. 1 is a longitudinal sectional view of a zig-zag bent plate forming the positive electrode of the accumulator;

Fig. 2 is a plan view of a similar band supposed to be flattened;

Fig. 3 shows in section an element of an accumulator according to the invention;

Fig. 4 is a detail view, on an enlarged scale, corresponding to a portion of Fig. 3; this view showing in section the device for the outlet of the gases;

Fig. 5 is a detail view, on an enlarged scale, corresponding to a portion of Fig. 3; this view showing in section the specific form of the terminal of the accumulator;

Figs. 15 and 17 are diagrammatical views illustrating the manufacture of the negative electrodes of the last mentioned embodiment;

Figs. 16 and 18 are corresponding detail views.

Figures 6, 7, 8:
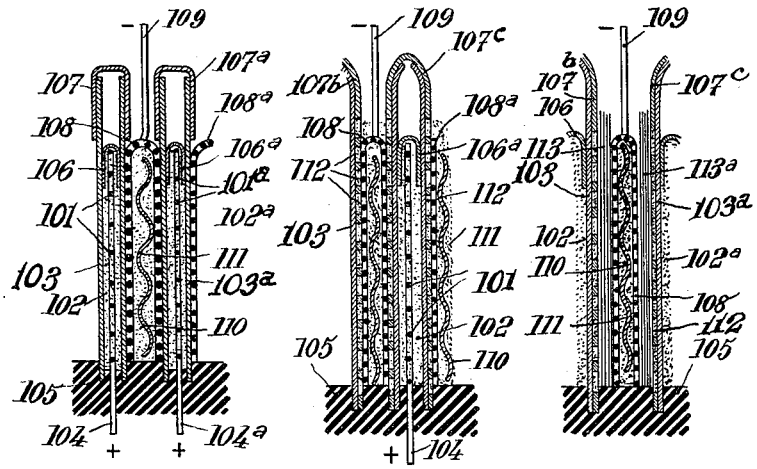
Fig. 6 is a transverse sectional view of a portion of an accumulator according to another embodiment of the invention.
Figs. 7 and 8 are sectional views, showing modifications.

In the embodiment of Figs. 1 to 5, the positive element is constituted by a series of plates 1, made of an insoluble metal, such as silver. These plates are corrugated or provided with holes, or again in the form of gauzes, and they are covered with finely divided silver, eventually agglomerated by means of potash and a binding substance soluble in potash, such as some sea-weeds. After dissolution of these sea-weeds, the silver mass acquires its diffuse character. Around plates 1, interconnected by parts 2 of a metal which does not form a couple with the zinc and is not attacked by the electrolyte, such as copper which also serve to keep them at a suitable distance from one another for the subsequent folding, a sheet 3 of Cellophane is wound several times, in such manner as to form a flat band as shown by Fig. 2. This band is then bent upon itself in zig-zag fashion along the median lines between two plates and along the median lines of the plates in the manner illustrated by Fig. 1. The folds corresponding to the median lines between the plates are notched at the ends thereof opposed to connections 2, as shown at 4, so as to permit an improved absorption of the electrolyte by Cellophane and also the escape of the gases. The zig-zag bent band is of a length such that, after its introduction into metallic container or casing 5, it is but little flattened and leaves between its folds free spaces in which the negative plates 6 are disposed, as shown by Fig. 3.

These negative plates are analogous to plates 1, that is to say corrugated or provided with holes, or again constituted by wire gauzes, and they are made of the same metal, silver in the present case. They may, for instance, be previously covered with a soluble metal, through any suitable method. Or, preferably, they are covered with the soluble metal, in the accumulator element itself, as it will be hereinafter explained. All the negative plates 6, connected together, are electrically connected to the metallic case 5 through a connection 7.

The loose wrapping formed by the positive band 3, surrounding, in its recesses, the negative plates 6, is immersed in an alkaline solution, such, for instance, as a solution of potash and lithia, the proportion of potash being sufficient for obtaining the necessary conductivity and the lithia being added up to saturation. This solution is poured into the casing in sufficient amount in order that, despite the absorption of Cellophane, there is always maintained a small amount of free liquid.

When plates 6 are coated with zinc in an electrolytic manner, I may proceed in the following manner: A sheet of zinc, electrically connected with the metallic container or casing 5 is subjected to the electrolytic action. Or alternately, a sufficient amount of zinc can be dissolved previously in the electrolyte in the form of potassium zincate.

Under the action of the charging current, plates 6 are covered with zinc, which they loose subsequently during the discharge. During this discharge, zinc swells and is deposited on all metallic internal walls in a more or less irregular manner, thus forming uneven heaps of zinc, which are the cause of the reduction of internal resistance that is observed. These heaps are in the form of an arborization (as shown by Fig. 3) the very tenuous elements 6ª of which are at right angles to the metallic surfaces. Eventually, in order to increase the area of deposition of zinc, and to slow down its dissolving with the circuit open, the internal wall of the metallic casing 5 may be silver-coated.

The metallic container or casing 5 may, for instance, be made of brass. It is made in a single piece through any mechanical method. A cover 8, engaged in the casing 5 and mechanically adjusted, is welded to the casing, thus ensuring a fluidtight closing. This cover carries a device permitting the outflow of the gases while preventing the accidental escape of the alkaline liquid. According to this device, the cover includes a kind of tubular element 9, Fig. 4, projecting inwardly, and the bottom of which is provided with an orifice communicating with the inside of the accumulator. In this tubular part is screwed a piece 10, provided with an axial passage, which applies against the bottom of said tubular part, through a ring 11 of brass or a similar matter, a membrane 12 of rubber provided with a pinhole. The space above part 10 is packed with asbestos 13, and a lid or ring 14, provided with a hole, closes the tubular part at the upper part thereof. The height of tubular part 9 is such that, when the accumulator is upside down, the small amount of free electrolyte contained in container or casing 5, which now surrounds the tubular part, does not submerge the orifice through which said tubular part communicates with the inside of the accumulator. The chances of escape of the liquid are thus reduced to a minimum and furthermore if some drops happened, in the most unfavorable case, to escape from the small hole of membrane 12, they would then be absorbed by the asbestos packing 13.

As shown in Figure 5, I provide a terminal including two insulating pieces 15, 16 assembled to the cover by means of a threaded rod 17 and a nut 18, with a ring 19 of rubber or an analogous matter interposed between piece 15 and cover 8. The insulating element 15 is provided, at its lower part, with a recess into which is engaged the end of a conductor 20 surrounded by a protective sheath 21, made of a matter which is unattacked by the electrolyte such as vulcanized rubber. This wire 20 is brazed on rod 17 and pitch 22 is poured in the recess of piece 15. At its other end, wire 20, still surrounded by its protective sheath 21, is imprisoned in band 5 before being connected to one of the positive plates 1.

Of course, this arrangement is not the only possible one within the scope of the invention. For instance, negative plates 6, instead of being in the form of wire gauzes, might be constituted each by a zinc sheet about which would be wound a silver thread electrically connected with container or casing 5, or again they might be formed of metallic threads, folded, wound, interwoven or otherwise arranged.

Of course, instead of wrapping all the positive plates in a single band of Cellophane, each plate may be protected by a Cellophane wrapping having the same folding and protection characteristics as the output wires above described.

An accumulator made as above described can be given a very small size while having a relatively important capacity and being able to discharge rapidly. By way of example, it is possible, for instance, to obtain an accumulator the size of which is but little larger than that of an ordinary pocket lighter. It is therefore possible to employ with great advantage accumulators of this kind for making vest-pocket electric lamps.

In the embodiment of Fig. 6, a wire gauze or metallic fabric 101, of copper, silver, or another metal which is not attacked by the electrolyte, is coated with a paste of active matter containing principally finely divided silver, 102, and this element 101 constitutes the anode of the accumulator during the charging operation. This active matter 102 is maintained by means of Cellophane 103, which acts as a porous diaphragm. A conductor 104, connected with grid-shaped element 101 acts as connection for the positive electrode thus constituted. Other identical positive electrodes, such as 101ª, 102ª, 103ª, with a connection 104ª, may be employed. These positive electrodes are kept in the desired space relation by embedding their lower ends in an insulating matter 105, previously melted and then solidified. The whole is arranged in such manner that the edges of the Cellophane elements 103, 103ª are caught in the insulating substance 105, same as the connections 104, 104ª. At the upper end, the Cellophane elements are made in such manner as to form caps 106, 106a which keep the silver in position and prevent short-circuits as might result from the dropping of silver into the small bags formed by the positive electrodes together with their Cellophane elements. In order to further increase safety from this point of view, the Cellophane elements 103, 103ª may be prolonged at their upper parts beyond the positive electrode and they may be provided with additional caps 107, 107ª.

Between the positive electrodes thus made I provide wire gauzes 108, 108a which may, as shown in the drawings, be folded upon themselves in V-shaped fashion, in such manner as to form a kind of compartment on the inside of which there is provided a corrugated sheet of soluble metal, 110, zinc for instance, which swells, as shown at 111, in the course of the operation. These wire gauzes are made of an insoluble metal in the alkaline electrolyte, for instance copper or silver. They are connected with conductors such as 109 serving as connections.

The action of such a cell is as follows:

During the charging zinc and hydrogen are carried on to the negative electrodes while oxygen is carried on to the positive electrodes and oxidizes the silver; during discharge hydrogen is carried to the positive electrodes and reduces the silver, while oxygen is carried to the negative electrodes and aids in the dissolving of the zinc, which passes at least partially into potassium zincate.

Concerning the structure of the positive electrode proper, I may make use of one or several wire gauzes such as 101, with large meshes. The coating is made by moistening silver with a humid silver paste, preferably with the electrolyte. The connection of conductor 104 with the wire gauze 101 can be obtained by passing conductor 104 in zig-zag fashion through the meshes of the wire gauze in a manner analogous to the arrangement of a thread of a woven fabric.

The thickness of the imperforate but porous Cellophane sheet 103 surrounding the positive electrode is of considerable importance. Experience taught that if this sheet is too thin zinc crystallizations occur which finally pierce the sheet. The same drawback is also experienced if, in order to remedy the fragility of a sheet of Cellophane, use is made of several superposed thin sheets. Through the perforations of the thin sheets of Cellophane, conducting chains are formed which produce internal short-circuits. On the other hand, if a smaller number of sheets of greater thickness is employed, the short-circuits are indeed eliminated; however, there is a limit to the increase of the thickness of each sheet by the increase of the internal resistance of the accumulator. The good working of the storage battery is really obtained with Cellophane sheets of a minimum thickness of one tenth of millimeter for atmospheric, hygroscopic, and other conditions which are normal.

The negative compartment, formed by wire gauze 108, surrounding zinc sheet 110, can be improved, same as the mechanical mounting of the elements, by prolonging the caps down to the bottom in such manner that their ends are embedded in the insulating substance 105, as shown at 107b, 107c in Fig. 7. The prolonged portion of these caps is widely apertured opposite the positive plates in order to permit a storing of the zinc that is deposited by electrolytic action and which, in this manner, does not deteriorate the Cellophane surrounding the positive electrode. These prolonged caps 107b, 107c may for instance be made of Cellophane or another matter which is an insulator unattacked by the electrolyte. This additional sheet of Cellophane or another insulating matter is not necessarily constituted by prolonged parts of caps 107b, 107c. The holes 112 of this sheet are filled with powdery zinc, which is stopped by the solid Cellophane diaphragm 103.

In the embodiment of Fig. 8 layers of drawn glass 113, 113a are added between the perforated additional sheet 107b, 107c and the metallic wire gauze 108. These layers of drawn glass might suffice to ensure by themselves the separation of zinc deposited on the negative gauze 108, on the side of the positive electrode.

Figure 9:
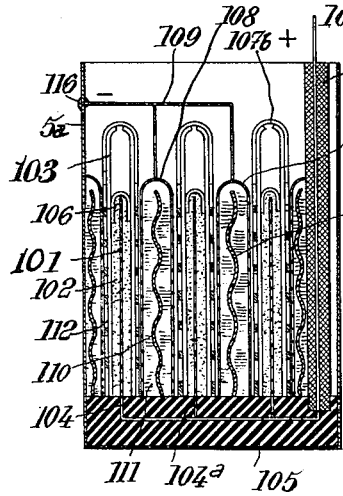
Fig. 9 shows in transverse section the electrical and mechanical connection of a group of electrodes with its container or casing.

The negative electrode units thus constituted are mechanically and electrically connected with a metallic container or casing 5a in the manner diagrammatically shown by Fig. 9. All the positive connections 104, 104a are connected together in the layer of insulating substance 105, and a common positive connection 104b, surrounded by an insulating sheath 115, of rubber or another matter which is not attacked by the electrolyte, projects to the outside. The negative connections are welded to the container 5a at 116. It is also possible to dispense with the connections 109 and the weld 116 by providing a sufficient mechanical and electrical contact between the negative wire gauzes 108, 108a, . . . and the container 5a.

Figure 10:
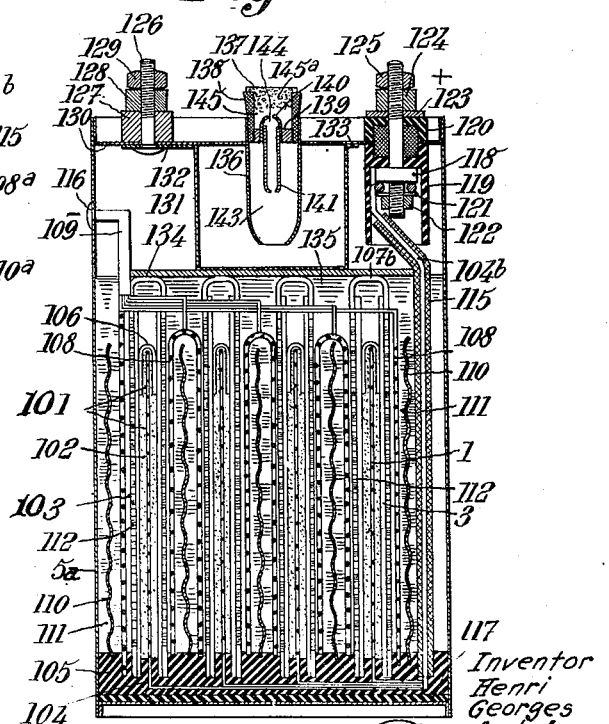
Fig. 10 shows a practical construction of an accumulator made according to the present invention.

Fig. 10 shows in transverse section a complete example of an accumulator made according to the invention. The electrode group, together with its layer of insulating material 105 rests upon an insulating sheet 117, for instance of rubber, which permits of engaging the group of electrodes into container 5a without any danger of establishing an electric contact between the bottom of container 5a and the bare connections that might project from the bottom of 105. The positive collecting connection 104b, surrounded by its insulating sheath 115, leads to a terminal 118 which is provided in such manner as to constitute a fluid tight joint through the assembly of the recessed ebonite pieces 119 and 120, one of which, the lower one 119, located on the inside of the container, protects the terminal against short-circuits as might be caused, after the accumulator is turned upside down, by particles of zinc deposited between the terminal and the metallic container.

The positive collecting connection 104b is held tight on the terminal 118 under ring 121 by a nut 122. Ring 123 and nut 124 ensure the fixation of the whole of terminal 118. Nut 125 serves to the electrical connection with the utilization circuit.

The negative terminal 126, welded to the cover 130, is tightened in position by nut 128 and ring 127 for mounting purposes and it ensures a certain rigidity to the connection of utilization, which is tightly held by nut 129.

Under terminal 126, and when mounting the parts, I fix a stirrup or strap 131, which is rendered fluidtight at 132 by soldering and also soldered at 133 so as to ensure its rigidity. This stirrup fixes the upper level of the electrodes, from which it is insulated by a rubber sheet 134. Its function is very useful because it determines the level at which the electrolyte 135 must stop. It permits, after having submerged its horizontal portion, which is visible through the filling orifice, to remove by means of any suitable instrument the whole of the excess of electrolyte.

The plug and the filling orifice are made especially with a view to eliminating any possibility of an appreciable leakage of electrolyte after the accumulator has been turned upside down. For this purpose, a metallic tube 136, welded to cover 130, has its lower end made of restricted section in such manner as to form a baffle-like connection with the outlet orifice for all positions of the accumulator. The plug, which is constituted by the supporting metallic cap 137, surrounded by a rubber tube 138, includes a rubber joint 139 which simultaneously holds in a tight manner a glass tube 141, also arranged in baffle-like manner, and a nozzle 140, provided with a pinhole and made of pure gum. Owing to this plug, if the accumulator is normally turned upside down, the electrolyte remains in zone 142. If the accumulator is shaken, some drops of electrolyte may penetrate into space 143, and then into tube 141 and nozzle 140, the space 144 of which is thus filled. If, under these conditions, no expansion takes place, no leakage takes place. The space 145, which may be partly or wholly filled with a sponge-like matter 145a, then suffices to receive the drop of electrolyte stored up by capillarity during the charging operations that follow the accident. Furthermore, the hollow cover 130 is capable of avoiding a further advance of the electrolyte a portion of which evaporates while the remainder crystallizes while becoming carbonated. Experience fully justifies these precautions provided that all the elements are dimensioned in taking into account the physical constants of the electrolyte, such as viscosity, superficial tension, and so on.

The metallic container 5a is made of a metal which can easily be soldered with usual solders, such as tin, copper, brass, bronze, etc., the latter metals permitting the construction of containers of an exceptionally small thickness, owing to their chemical passivity with respect to the electrolyte. On the other hand, the polarization potential of these metals corresponds to that of zinc and, therefore, a container made of said metals plays the same part as the supports of the negative electrodes, that is to say wire gauzes 108, 108a, and thus cooperates in an advantageous manner to the working of the accumulator. Furthermore, owing to their particular construction, the electrodes serve to store up the electrolyte, which is thus nearly immobilized.

Of course, this advantageous construction of the accumulator is given merely by way of example and, for instance, several parts of the accumulator might be assembled by moulding or suitable machining.

An accumulator such as just above described is such that, under discharge conditions corresponding to a period of time of one hour, the ratio of its weight and the energy it supplies is equal to one third of the same ratio corresponding to lead accumulators, and the volume occupied by an accumulator according to the invention is about one half of that of a lead accumulator. Furthermore, in case of violent discharge conditions, in a period of time of ten minutes, the accumulator according to the invention is five times lighter than a lead accumulator. The shorter the time of discharge, the greater the relative lightness of the accumulator according to the invention.

Figure 11:
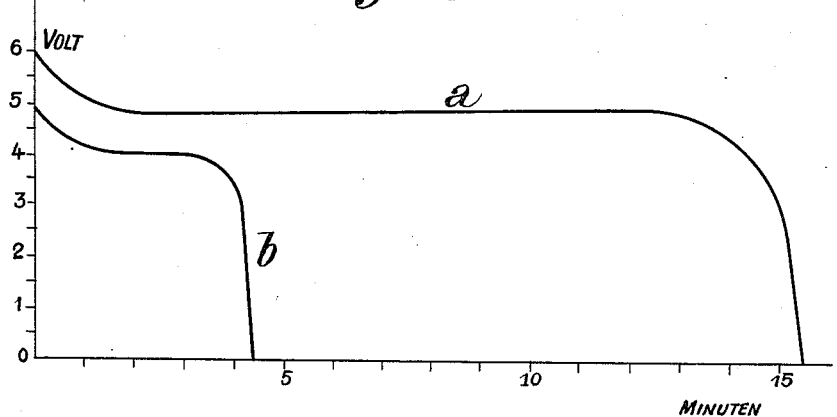
Fig. 11 is a diagram for comparison of the discharge curves of the accumulator according to the invention and of an ordinary lead accumulator.
Figure 12:
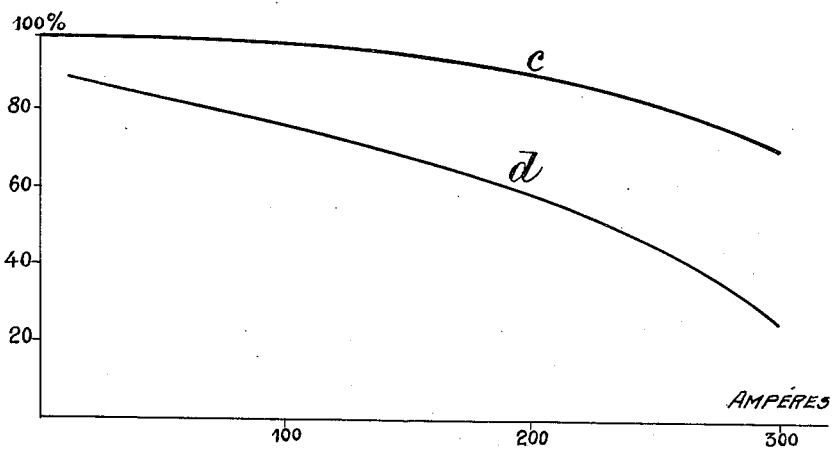
Fig. 12 is a diagram for comparison of the quantitative outputs of the accumulator according to the invention and of an ordinary lead accumulator, respectively.

By way of example, Figs. 11 and 12 show the comparison between the best lead accumulator existing at the present time (a, c) and a storage battery made according to the present invention (b, d). Fig. 11 shows, for very violent discharge conditions, in a period of time of about fifteen minutes, that the accumulator according to the invention ensures a considerable advantage. In a likewise manner, the comparative curves of Fig. 12, relative to the quantitative efficiency, and indicating the percentage of the full charge which can be delivered at various rates of discharge, show a considerable advantage of the improved accumulator according to the invention.

Figure 13:
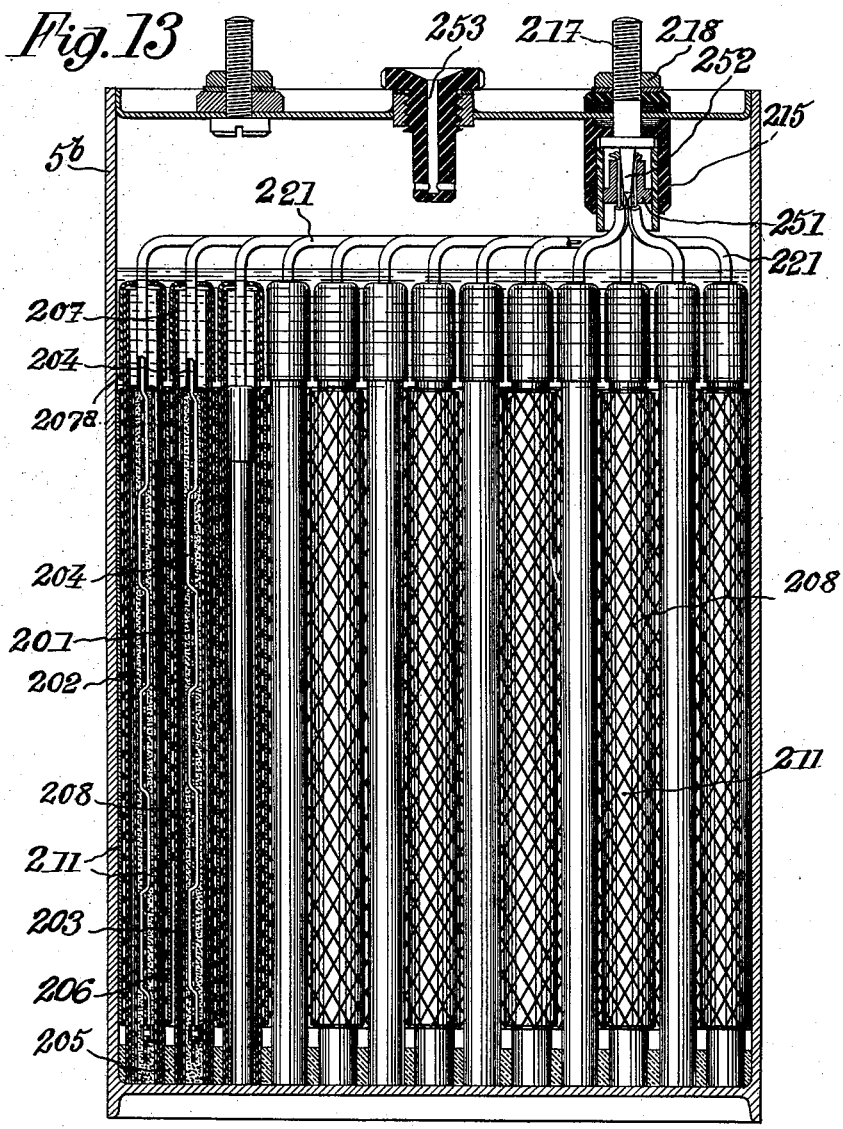
Fig. 13 is a vertical sectional view of still another embodiment of the accumulator according to the invention.
Figure 14:
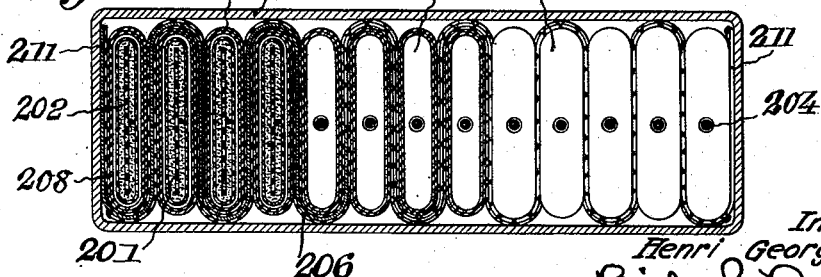
Fig. 14 is a transverse sectional view corresponding to Fig. 13.

In Figs. 13 and 14 of the drawings, I have shown, by way of example, an accumulator the positive elements of which are made as above described with reference to the second embodiment of the invention.

The insertion of the elements into the container is effected, for instance, in the following manner: the positive electrodes 202, mounted in the plaits of the negative electrode 206 and fabric 208, are caused to project at the lower part, and they are embedded, at their lower ends, in a layer 205 of paraffin lying on the bottom of the container 5b. Ends 211 of the negative electrode 206 rest against the end walls of container 5b.

According to another feature of the invention, in order to ensure the desired connections between the positive electrodes and the corresponding terminals 217, 218, the connecting means are not provided at the lower part of said electrodes so as to extend through the layer of paraffin, but they are provided at the upper part of the electrodes and consist of wires 204 which are first soldered or otherwise fixed to supports 201 for filling 202 covered by Cellophane 203 and are then fitted with a protecting coating 221 insoluble in the electrolyte, for instance rubber. These wires 204, which extend through caps 207, 207a, lead to terminals 217, 218, where they are, for instance, fixed by causing them to pass in a sleeve 251 against the walls of which they are applied by a kind of punch 252 carried by the element 217 of the terminal, the whole is protected by an ebonite cap 215.

The whole is completed by a negative terminal fixed to the casing or container and by a plug 253, of a suitable type.

In a general manner, in preferred embodiments of the accumulator according to the present invention, I interpose between, on the one hand, the negative electrode and, on the other hand, the elements constituting the positive electrode, means capable of retaining the particles of soluble metal coming from the negative electrode, these means including, for this purpose, inside a reduced volume and with a reduced weight, a great number of partitions extending transversely to the direction along which said particles are dropping.

Such means may be made in various manners. For instance I may make use of honeycombed structures. But such structures have the drawback of interfering with the flow of the gases which can not escape freely along the surfaces of the electrodes.

Therefore, it seems advantageous to arrange said means in such manner that they further ensure the free circulation of gases, and, according to a preferred embodiment of the present invention, I make use of a metallic netting or fabric which includes important supporting surfaces in the transverse direction and which, in the case of said netting or fabric being held between two electrodes, leaves free passages between the various cells limited by the wires of which it is made.

These conditions are complied with if use is made of a kind of metallic knitted fabric 208 made of flattened wires which are mostly in a transverse direction with respect to the general plane of the fabric, as shown by Fig. 16, except at the points where two wires cross each other, where, on the contrary, these wires are oblique, which obviously ensures the desired passages between adjoining cells.

Of course, the particular knitted fabric illustrated in the drawings is given merely by way of example, and the invention covers, in a general manner, all means capable, while separating the positive electrodes from the negative electrodes, of forming a galvanostegic support while permitting the flow of the gases.

Of course, the metal employed for making the supports in question must be chosen such that it does not form cells in the presence of the soluble metal of the negative electrode, as above stated. If, as it will be hereinafter assumed, the soluble electrode is of zinc, said means may for instance be made of copper or iron.

In order to fix this knitted fabric in position, between the corresponding negative and positive elements, it is previously mounted on the negative elements, this method being particularly advantageous when, according to the invention, said negative element consists of a single part, of undulated shape, in the folds of which the positive elements wrapped in Cellophane are inserted.

According to a simple embodiment, this undulated element consists of a sheet of zinc 206 of suitable thickness. If the metallic fabric is woven or knitted in a round shape as shown by Fig. 15, it suffices to introduce into the cylinder constituted by said fabric a plate of zinc of suitable size (Fig. 17) and then to fold the whole in accordion-plaited manner (Fig. 18).

Furthermore, it is advantageous to combine the whole of the electrodes and the container 5b of the accumulator in such manner that the ends of the negative electrode are applied elastically against the lateral walls of said container. With this arrangement, supposing the container to be made of a metal, it is unnecessary to provide special connections for connecting the negative electrode to the container, which permits of reducing the weight of the whole. In order to ensure a perfect contact, the surfaces 211 of the accordion plaited element that are to bear against the walls of the container are preferably bare, that is to say free from fabric 208, the free ends of said fabric being then soldered against element 206 at 255 (Fig. 18).

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An accumulator which comprises, in combination, a container, an electrolyte in said container, a series of positive electrode elements made of a metal insoluble in said electrolyte, a cellulosic wrapping surrounding each of said positive electrode elements, said positive elements together with their respective wrappings being disposed vertically at a distance from one another in said container, in substantially parallel relationship, a sheet of a metal soluble in said electrolyte, a metallic envelope surrounding said sheet of a structure capable of forming a multiplicity of supports at different levels for a finely divided matter dropping along said sheet, without interfering with the flow of gases along said sheet, the whole of said sheet and said metallic support being plaited in zig-zag fashion, so that the positive electrode elements are inserted between said plaits, the metal of said support being such that it does not form electric cells with the metals of the other elements, and means for electrically connecting together all of said positive electrode elements.

2. An accumulator according to claim 1 in which said metallic support consists of a wire knitted structure.

3. An accumulator according to claim 1 in which said container is metallic, the ends of said plaited sheet being bare and bearing in an elastic manner against said container.

4. An accumulator according to claim 1 in which said means for electrically interconnecting the positive electrode elements are located at the upper parts of said elements and extend above the level of the electrolyte.

HENRI GEORGES ANDRÉ.